US007722235B2

(12) United States Patent
Mochizuki et al.

(10) Patent No.: US 7,722,235 B2

(45) Date of Patent: May 25, 2010

(54) VEHICLE HEADLAMP

(75) Inventors: Kazuhisa Mochizuki, Shizuoka (JP); Nobutaka Tezuka, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 12/258,477

(22) Filed: Oct. 27, 2008

(65) Prior Publication Data

US 2009/0122567 A1 May 14, 2009

(30) Foreign Application Priority Data

Nov. 9, 2007 (JP) ............................ 2007-291707

(51) Int. Cl.
*B60Q 1/04* (2006.01)

(52) U.S. Cl. ...................................... 362/539; 362/538

(58) Field of Classification Search ................. 362/297, 362/507, 516, 518, 538, 539, 544, 545
See application file for complete search history.

(56) References Cited

U.S. PATENT DOCUMENTS

| | | | | |
|---|---|---|---|---|
| 5,931,570 | A * | 8/1999 | Yamuro | 362/355 |
| 6,948,836 | B2 * | 9/2005 | Ishida et al. | 362/516 |
| 7,097,334 | B2 * | 8/2006 | Ishida et al. | 362/516 |
| 7,156,544 | B2 * | 1/2007 | Ishida | 362/538 |
| 7,201,507 | B2 * | 4/2007 | Takeda et al. | 362/545 |
| 2009/0135581 | A1 * | 5/2009 | Yano et al. | 362/84 |

FOREIGN PATENT DOCUMENTS

| | | | |
|---|---|---|---|
| JP | 2003-317513 | A | 11/2003 |
| JP | 2004-241349 | A | 8/2004 |

* cited by examiner

*Primary Examiner*—Hargobind S Sawhney
(74) *Attorney, Agent, or Firm*—Sughrue Mion, PLLC

(57) ABSTRACT

A vehicle headlamp is provided. The vehicle headlamp includes a projection-type light source unit housed in a lamp chamber. The light source unit includes a projection lens; a shade; a light emitting diode (LED) light source; a reflector; and an optical element. The LED light source includes a substrate; an LED chip disposed on the substrate such that the LED chip is oriented in a direction substantially perpendicular to an optical axis of the light source unit; and a cover member. A region of the cover member includes concave and convex portions so as to diffuse light transmitted through the cover member. The reflector reflects and guides the light from the LED light source onto a rear focus of the projection lens. The optical element guides the diffused light transmitted through the cover toward a front side of the vehicle headlamp so as to form an overhead light distribution.

11 Claims, 7 Drawing Sheets

VEHICLE HEADLAMP

This application claims priority from Japanese Patent Application No. 2007-2 91707, filed on Nov. 9, 2007, the entire contents of which are hereby incorporated by reference.

BACKGROUND OF THE INVENTION

1. Technical Field

Apparatuses and devices consistent with the present invention relate to a vehicle headlamp which includes a projection-type light source and, more particularly, to a vehicle headlamp that effectively uses light non-reflected light as overhead light distribution.

2. Related Art

For example, Japanese Patent Application No. JP-A-2003-317513 describes a related art vehicle headlamp. According to a lamp structure of JP-A-2003-317513, the related art vehicle headlamp includes a projection-type light source unit for a high beam. The projection-type light unit includes a projection lens, a light emitting device, and a reflector for reflecting light emitted from the light emitting device such that the light converges to a rear focus of the projection lens. With this lamp structure, light emitted from the light emitting device is reflected twice by a sub-reflecting surface that extends forward from the front edge of the reflector, and an upward sub-reflecting surface that is provided near a rear focus of the projection lens so as to guide the light to the projection lens. Therefore, in addition to the light distribution pattern for the high beam formed by the reflector and the projection lens, the lamp structure provides a light distribution pattern widely diffused outward to the left and right sides.

Further, Japanese Patent Application No. JP-A-2004-241349 describes another related art vehicle headlamp. The related art vehicle headlamp includes a translucent member where the projection lens, a cut-off line forming shade, a light emitting device, and a reflector are integrally formed. In the lamp structure, a subreflector is formed on an outer surface between the reflector and the projection lens, and light reflected from the subreflector is radiated forward from the outer surface of the projection lens. Therefore, in addition to the light distribution pattern for a low beam that has a cut-off line corresponding to the cut-off line forming shade, the lamp structure provides a small light distribution pattern, which mainly illuminates a central region of the light distribution pattern.

However, the added light distribution patterns described in JP-A-2003-317513 and JP-A-2004-241349 have excessively high luminous flux density (i.e., excessive brightness) as the overhead light distribution used for the light distribution pattern for a low beam. Here, the overhead light distribution denotes light distribution that has low luminous flux density and illuminates a part of an upper portion of the cut-off line of light distribution pattern for a low beam in order to improve the visibility of a road sign or a trade sign provided on the front upper side. The intensity of the overhead light distribution is prescribed in a light distribution standard of a lamp. Accordingly, since the light from the added light distribution patterns in JP-A-2003-317513 and JP-A-2004-241349 becomes glare light against an oncoming vehicle, the lamp structures described above have a disadvantage in that they cannot be used as a headlamp for a low beam.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a vehicle headlamp that can form a low beam having excellent visibility by adding adequate overhead light distribution but that does not become glare light against an oncoming vehicle.

According to one or more aspects of the present invention, there is provided a vehicle headlamp. The vehicle headlamp includes at least one projection-type light source unit housed in a lamp chamber. The projection-type light source includes a projection lens; a shade forming a cut-off line; an LED light source for emitting light, wherein the LED light source includes a substrate; an LED chip disposed on the substrate; and a translucent spherical cover member covering the LED chip, and is disposed such that an irradiation center axis of the LED chip is oriented in a direction substantially perpendicular to an optical axis of the projection-type light source unit, and wherein fine concave and convex portions are formed on a region of the cover member except a region corresponding to the reflector so as to diffuse light transmitted through the cover member, a reflector configured to reflect and guide the light emitted from the LED light source such that the light is concentrated near a rear focus of the projection lens; and an optical element configured to guide the diffused light toward a front side of the vehicle headlamp so as to form an overhead light distribution.

DETAILED DESCRIPTION OF EXEMPLARY EMBODIMENTS OF THE INVENTION

Exemplary embodiments of the present invention will now be described with reference to the drawings.

Figure 1:
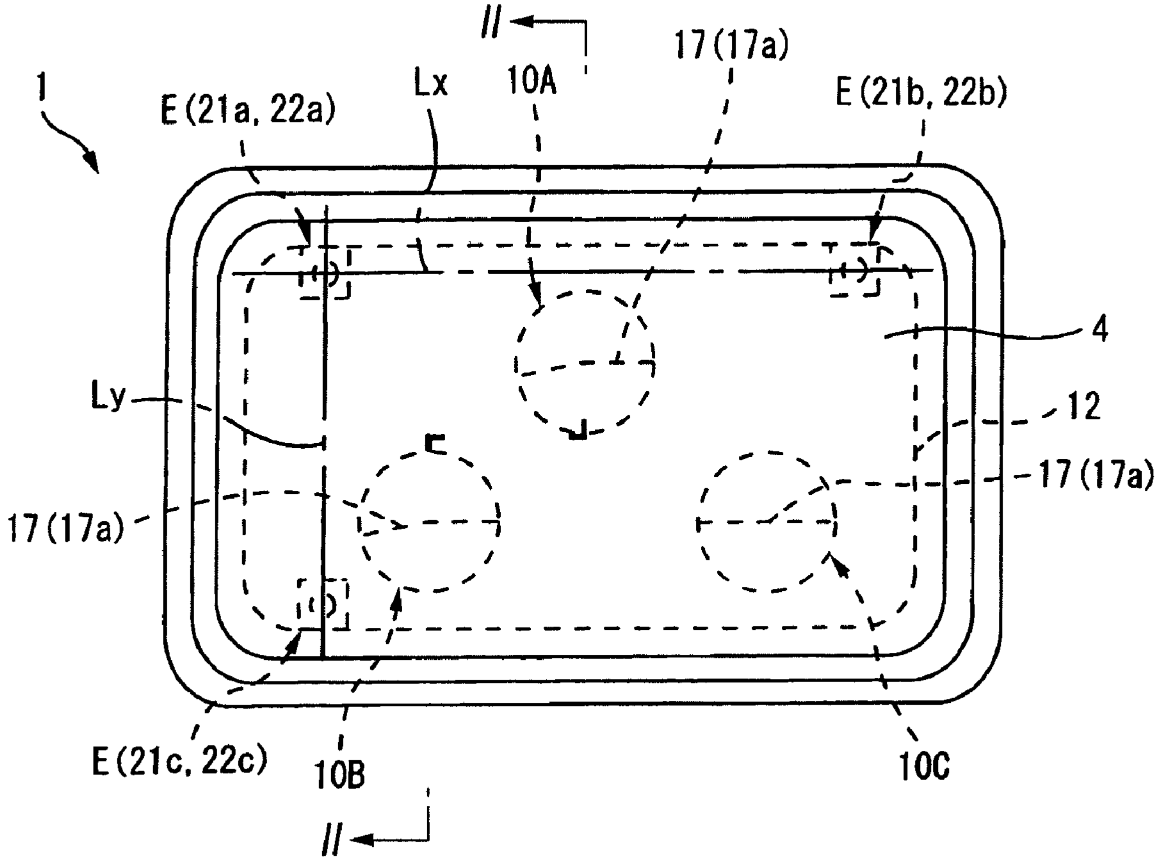
FIG. 1 is a front view of a vehicle headlamp according to a first exemplary embodiment of the present invention.
Figure 2:
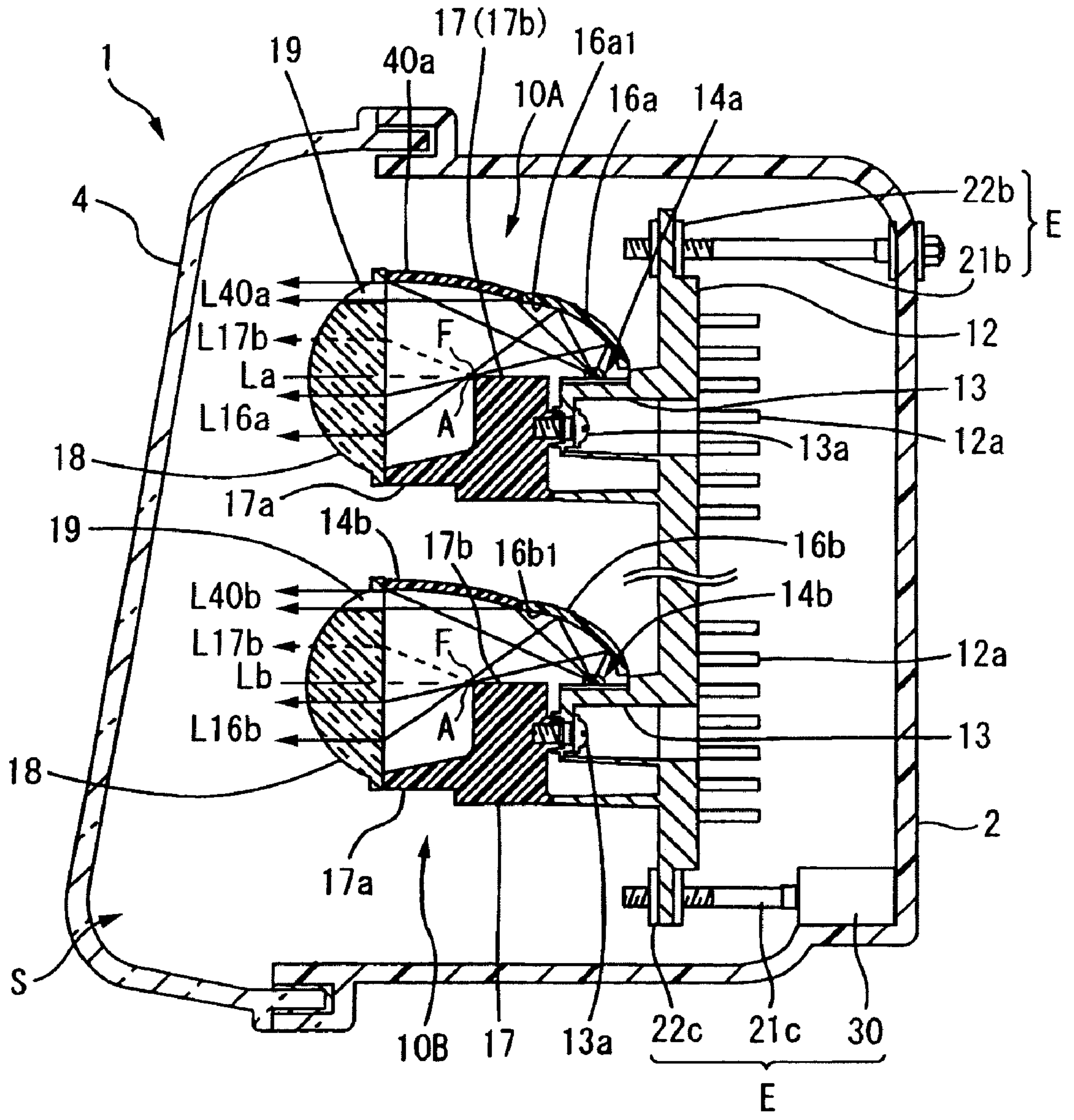
FIG. 2 is a longitudinal sectional view of the vehicle headlamp of FIG. 1, taken along line II-II, showing first and second projection-type light source units.

As shown in FIGS. 1 and 2, a vehicle headlamp 1 includes a light source unit assembly 10, which is formed by integrating a first projection-type light source unit 10A, a second projection-type light source unit 10B, and a third projection-type light source unit 10C with a lamp bracket 12. The light source unit assembly 10 is housed in a lamp chamber S that is formed by a container-shaped lamp body 2 and a transparent front cover 4. The light source unit assembly 10 is supported by an automatic leveling mechanism E so as to be tilted in a vertical direction. The automatic leveling mechanism E is also an aiming mechanism provided between the lamp bracket 12 and the lamp body 2.

That is, the automatic leveling mechanism E includes a pair (i.e., left and right) of aiming screws 21*a* and 21*b*, a pair (i.e., left and right) of aiming nuts 22*a* and 22*b*, and an actuator 30. Each of the aiming screws 21*a* and 21*b* is rotatably supported by a through hole formed in the rear wall of the lamp body 2. The aiming nuts 22*a* and 22*b* are provided on the lamp bracket 12 so as to be engaged with the aiming screws 21 a and 21*b*, respectively. The actuator 30 is provided on an inside of the rear wall of the lamp body 2 directly below the aiming screw 21*a* and includes a rotational drive shaft 21*c*. The rotational drive shaft 21*c* extends parallel to the aiming screws 21*a* and 21*b*, and an aiming nut 22*c* is provided on the lamp bracket 12 so as to be engaged with a screw portion formed at the end of the rotational drive shaft 21*c*.

The automatic leveling mechanism enables the light source unit assembly 10 to be tilted about a leveling axis Lx which passes through the nuts 22*a* and 22*b* by activating the actuator 30 to rotate the rotational drive shaft 21*c*. Further, the actuator 30 rotates the rotational drive shaft 21*c* on the basis of a signal sent from, for example, a centroid position detecting sensor (not shown) that detects the forward and rearward movement of the centroid position of the vehicle, so as to move forward and rearward the aiming nut 22*c* along the rotational drive shaft 21*c*. Accordingly, the actuator tilts the vehicle headlamp 1 about the leveling axis Lx so that an optical axis of the vehicle headlamp 1 is always maintained at a constant angle about a driving road surface.

Furthermore, the aiming screw 21*b* functions as a horizontal aiming screw that tilts the optical axis of the vehicle headlamp 1 about a vertical tilt axis Ly which is an axis passing through the aiming nuts 22*a* and 22*c*, and the aiming screws 21*a* and 21*b* function as vertical aiming screws that tilt the optical axis of the vehicle headlamp 1 about a virtual horizontal tilt axis passing through the aiming nut 22*c*. Accordingly, the automatic leveling mechanism E functions as an aiming mechanism.

In the light source unit assembly 10, the first projection-type light source unit 10A, the second projection-type light source unit 10B, and the third projection-type light source unit 10C are integrated in parallel on the front portion of the lamp bracket 12. The lamp bracket 12 is made of metal having high thermal conductivity such as aluminum and is formed into a substantially rectangular shape.

Each of the first projection-type light source unit 10A, the second projection-type light source unit 10B, and the third projection-type light source unit 10C have a same structure. Accordingly, the structure of the projection-type light source units will now be described with reference to the third projection-type light source unit 10C shown in FIG. 3. The third projection-type light source unit 10C includes a light emitting device 14*c*; a reflector 16*c*; a cut-off line forming shade 17; a convex projection lens 18; and a subreflector 40*c*. The light emitting device 14*c* is provided on the upper surface of a rectangular protrusion 13 protruding forward from the bracket 12. The reflector 16*c* is made of a resin and provided on the front protrusion 13 so as to cover the light emitting device 14*c*. The cut-off line forming shade 17 is made of a resin and fixed to the end of the front protrusion 13 by a screw 13*a*. The convex projection lens 18 is made of a resin and provided at the end of front extending portion 17*a* of the shade 17. The subreflector 40*c* for forming the overhead light distribution is provided between the convex lens 18 and the reflector 16*c*. The second projector-type light source unit 10B comprises a light emitting device 14*b*, a reflector 16*b*, a cut-off line forming shade 17, a convex projection lens 18, and a subreflector 40*b*, which are arranged similarly to the third projector-type light source unit 10C described above. Similarly, the first projector-type light source unit 10A comprises a light emitting device 14*a*, a reflector 16*a*, a cut-off line forming shade 17, a convex projection lens 18, and a subreflector 40*a*, which are arranged similarly to the third projector-type light source unit 10C described above. Each of the first and second projector-type light source units 10B and 10C are similarly configured, and are provided on respective front protrusions 13 which protrude forward from the bracket 12, as shown in FIG. 2. A plurality of radiating fins 12*a* are formed on the front and rear surfaces of the lamp bracket 12 at given positions.

Figure 3:
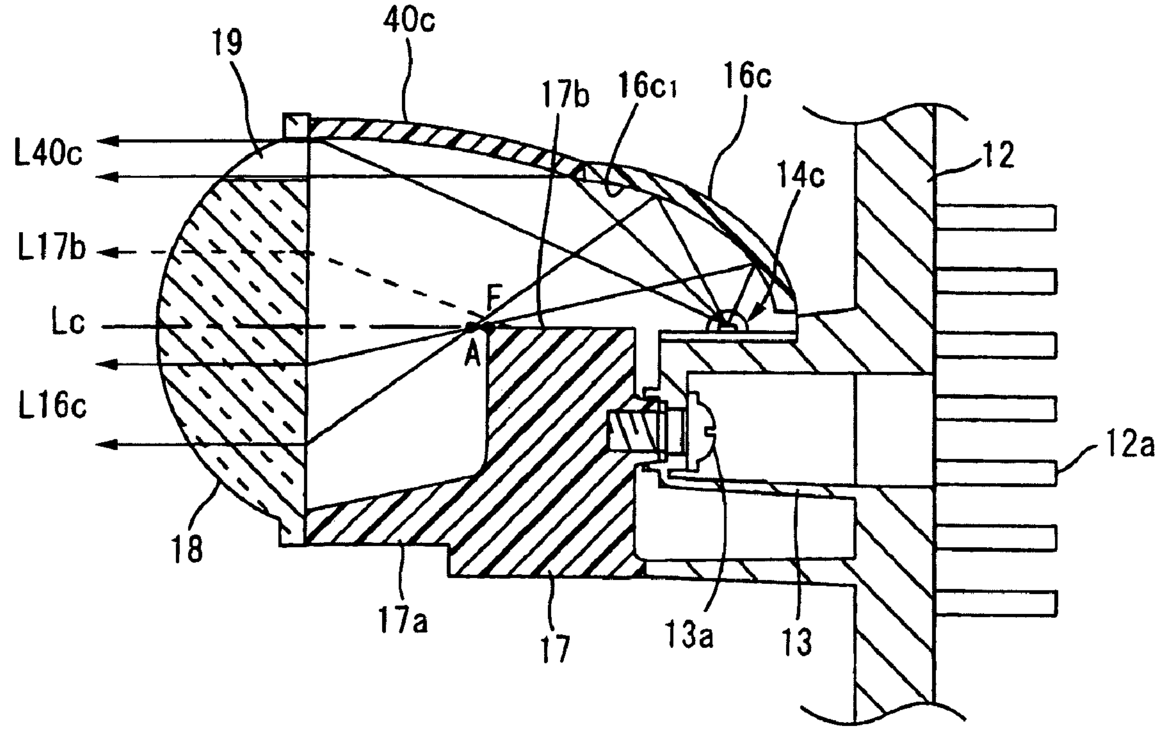
FIG. 3 is an enlarged longitudinal sectional view of a third projection-type light source unit of the vehicle headlamp of FIG. 2.

As shown in FIG. 3, the third projection-type light source unit 10C has an optical axis Lc that extends forward and rearward. The shade 17 substantially horizontally extends forward so that the upper front edge portion of the shade 17 is positioned near a rear focus F of the projection lens 18, and an upward reflecting surface 17*b* is formed on the upper surface of the upper front edge portion of the shade 17.

The convex projection lens 18 is provided along the optical axis Lc, and projects an image, which is formed on a focal plane including the rear focus F, on a virtual vertical screen that is positioned on the front side of the vehicle headlamp, as a reverse image.

The reflecting surface 16*c*1 of the reflector 16*c* is a substantially elliptical curved surface whose major axis is concentric with the optical axis Lc, and the first focus corresponds to the emission center of the light emitting device 14*c*. In this case, the shapes of the vertical cross-section of the reflecting surface 16*c*1 along the optical axis Lc is an elliptical shape that uses a point A positioned slightly ahead of the rear focus F of the lens as a second focus. Further, the eccentricity thereof is gradually increased from a vertical cross-section toward a horizontal cross-section. Accordingly, the reflector 16*c* makes light, which is emitted from the light emitting device 14*c*, converge into the point A on the vertical cross-section, and makes the convergence position move forward on the horizontal cross-section. The first projector-type light source unit 10A comprises an optical axis La and a reflecting surface 16*a*1 of the reflector 16*a*, and the second projector-type light source unit 10B comprises an optical axis Lb and a reflective surface 16*b*1 of the reflector 16*b*. Again, the configuration of the first projector-type light source unit 10A and the second projector-type light source unit 10B is the same as the third projector-type light source unit 10C.

An aluminum vapor deposition process is used on the upward reflecting surface 17*b* of the resinous shade 17. The front edge of the upward reflecting surface 17*b* of the resinous shade 17 extends along the focal plane including the rear focus F of the lens 18. Accordingly, as indicated by reference numeral L17*b* in FIG. 3, a part of the light, which is reflected by the reflector 16*c* and travels toward the point A, is reflected upward by the upward reflecting surface 17*b*, then enters the projection lens 18, and then radiates from the projection lens 18 as downward light.

Further, as shown in FIG. 3, the subreflector 40*c* is provided between the reflector 16*c* and the convex projection lens 18, and also is provided at the front edge portion 16*c*1 of the reflector 16*c* so as not to shield light, which is emitted from the light emitting device 14*c*, and which is reflected by the reflector 16c, and which travels toward the projection lens 18. Furthermore, a slit 19 is formed at the upper edge portion of the convex projection lens 18 to correspond to the subreflector 40c. As indicated by reference numeral L40c in FIGS. 3 and 4, the light, which is emitted from the light emitting device 14c and which is reflected by the subreflector 40c, is distributed forward from the slit 19. Again, as shown in FIGS. 2 and 4, the configuration of the first projector-type light source unit 10A and the second projector-type light source unit 10B is the same as the third projector-type light source unit 10C.

Figure 4:
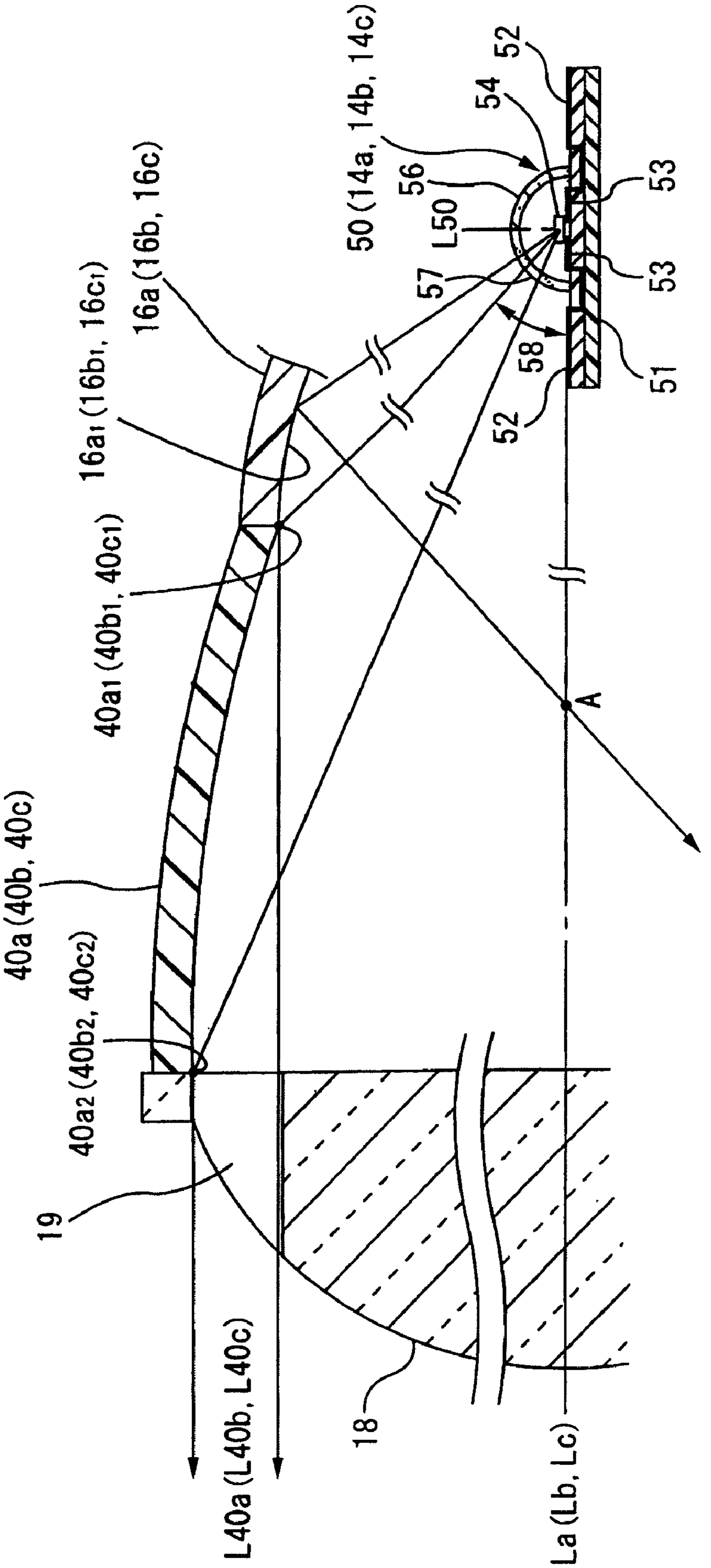
FIG. 4 is an enlarged cross-sectional view of an LED module of the projection-type light source unit of FIG. 3.

In addition, as enlarged in FIG. 4, the light emitting device 14a (14b, 14c) is formed of a white LED module 50. In the white LED module, a pair of electrodes 53 and 53 formed by conducting path patterns 52 is exposed on a laminated circuit board 51. A square LED chip 54 whose side size is about 0.3 to about 3 mm is disposed between the electrodes 53 and 53, and a transparent cover member 56 that is formed into a hemispherical shape and made of glass is integrated so as to cover the LED chip 54. The thickness of the cover member is about 0.5 to about 1 mm.

Further, as shown in FIG. 4, the LED module 50 is disposed such that the irradiation center axis L50 thereof is oriented toward the upper side so as to be substantially perpendicular to each of the optical axis La (Lb, Lc) of the projection-type light source unit 10A (10B, 10C). Fine concave and convex portions 57, which diffuse light radiated from the cover member 56, are formed on a region of the outer surface of the cover member 56, which corresponds to a region between a first outer edge 40a1 (40b1, 40c1) and a second outer edge 40a2 (40b2, 40c2), where the first outer edge 40a1 (40b1, 40c1) corresponds to a front edge portion of the reflector 16a (16b, 16c) and the second outer edge 40a2 (40b2, 40c2) corresponds to a front edge portion of the convex projection lens 18 (i.e., a region corresponding to the subreflector 40a (40b, 40c)). The fine concave and convex portions 57 may be formed on the cover member 56, for example, by etching a given region of the outer surface of the cover member 56.

Next, a light distribution pattern formed by each of the projection-type light source units 10A, 10B, and 10C will be described hereinafter.

Figure 5A:
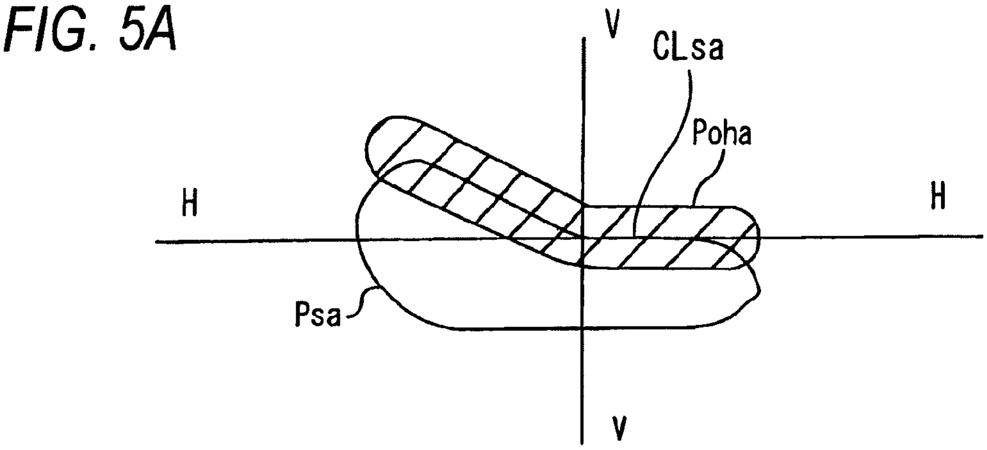
FIGS. 5A to 5C are front views of light distribution patterns of first, second, and third projection-type light source units, respectively, according to the first exemplary embodiment of the present invention.
Figure 5B:
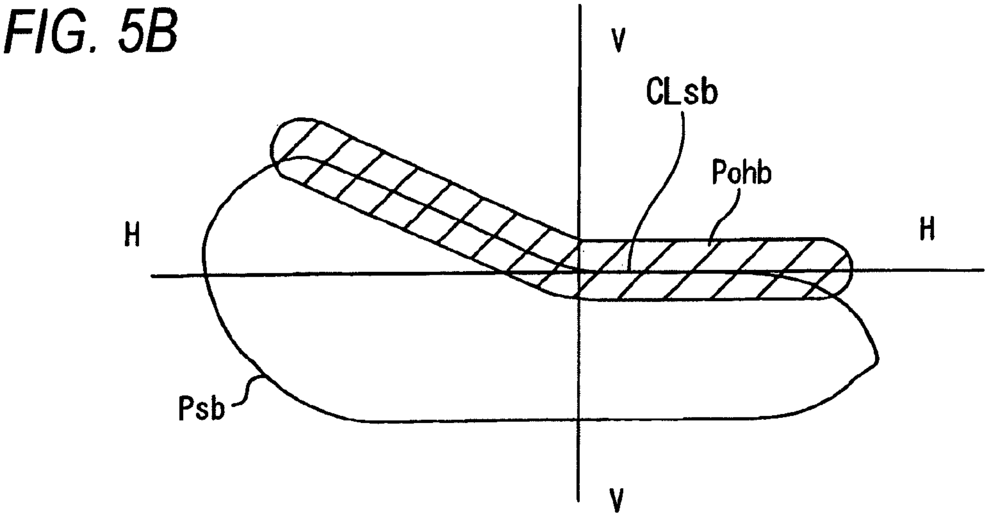
Figure 5C:
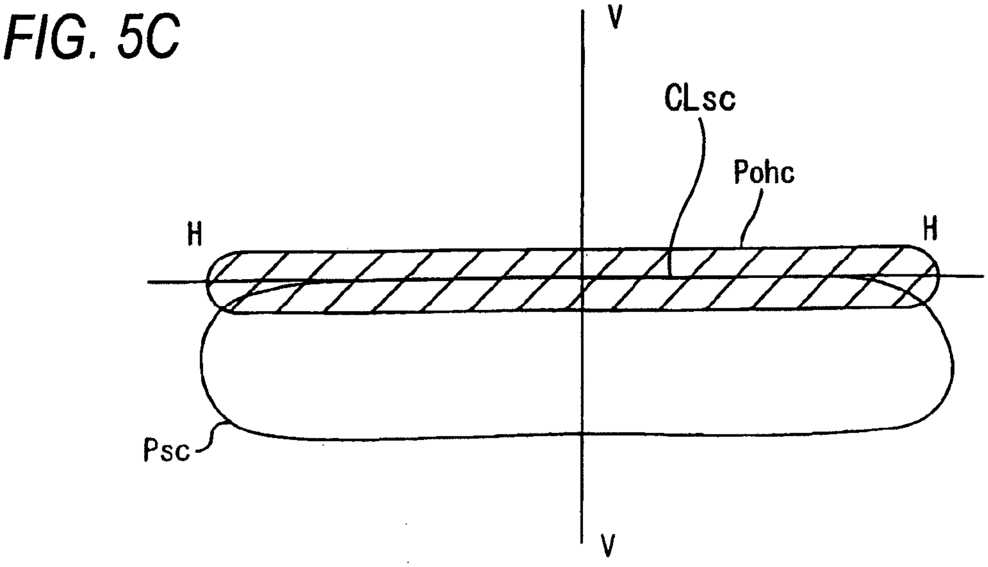

The light, which is transmitted through the cover member 56 and travels toward the reflector 16a (16b, 16c), of the light emitted from the LED chip 54 is reflected by the reflector 16a (16b, 16c) and guided so as to be concentrated on the point A near the rear focus of the projection lens 18. Further, the convex projection lens 18 projects an image, which is formed on the focal plane including the rear focus F, on a virtual vertical screen that is positioned on the front side of the vehicle headlamp, as a reverse image. As shown in FIGS. 5A-5C, the reflected light L17b of the upward reflecting surface 17b is distributed forward through the projection lens 18, so that a light distribution pattern for low beam (see reference character Psa (Psb, Psc), which has a clear cut-off line corresponding to the front edge of the cut-off line forming shade, is formed. However, as shown in FIGS. 5A-5C, the light, which is transmitted through the cover member 56 and travels toward the subreflector 40a (40b, 40c), of the light emitted from the LED chip 54 is reflected by the subreflector 40a (40b, 40c) and distributed forward from the slit 19 of the convex projection lens 18, so that an overhead light distribution pattern (see reference character Poha (Pohb, Pohc) for illuminating a given band-like region along the cut-off line of the light distribution pattern Psa (Psb, Psc) is formed. However, when the light emitted from the LED chip 54 is transmitted through the fine concave and convex portions 57 formed on the cover member 56, the light emitted from the LED chip 54 is changed into diffused light and guided to the subreflector 40a (40b, 40c). Accordingly, the overhead light distribution, which is diffused light formed by the subreflector 40a (40b, 40c), does not create a strong glare light against oncoming vehicles.

If the projection-type light source unit 10A having the above-mentioned structure is turned on, as shown in FIG. 5A, a light distribution pattern obtained by combining a light distribution pattern Psa for low beam with an overhead light distribution pattern Poha is formed on the virtual screen positioned 25 meters ahead. The light distribution pattern Psa for low beam has a given cut-off line CLsa substantially corresponding to a horizontal line H-H, and illuminates a substantially central portion of the screen. The overhead light distribution pattern Poha has a given width along the cut-off line CLsa.

The shapes of the front edge portions of the shades 17, the shapes of the reflecting surfaces 16b1 and 16c1 of the reflectors 16b and 16c, and the shapes of the subreflectors 40b and 40c of the second and third projection-type light source units 10B and 10C, respectively, are slightly different from those of the first projection-type light source unit 10A.

As shown in FIG. 5B, a light distribution pattern obtained by combining a light distribution pattern Psb for low beam with an overhead light distribution pattern Pohb is formed by the second projection-type light source unit 10B. The light distribution pattern Psb for low beam has a given cut-off line CLsb that illuminates a region spreading to the left and right sides from a substantially central portion of the screen, and the overhead light distribution pattern Pohb has a given width along the cut-off line CLsb.

Further, as shown in FIG. 5C, a light distribution pattern obtained by combining a light distribution pattern Psc for low beam with an overhead light distribution pattern Pohc is formed by the third projection-type light source unit 10C. The light distribution pattern Psc for low beam has a given cut-off line CLsc that illuminates a region widely spreading to the left and right sides from a substantially central portion of the screen, and the overhead light distribution pattern Pohc has a given width along the cut-off line CLsc.

As described above, the light source unit 10A is formed as a light concentrating projection-type light source unit that forms the small diffused light distribution pattern shown in FIG. 5A, the light source unit 10B is formed as a projection-type light source unit for intermediate diffusion that forms the intermediate diffused light distribution pattern shown in FIG. 5B, and the light source unit 10C is formed as a projection-type light source unit for wide diffusion that forms the wide diffused light distribution pattern shown in FIG. 5C.

Figure 6:
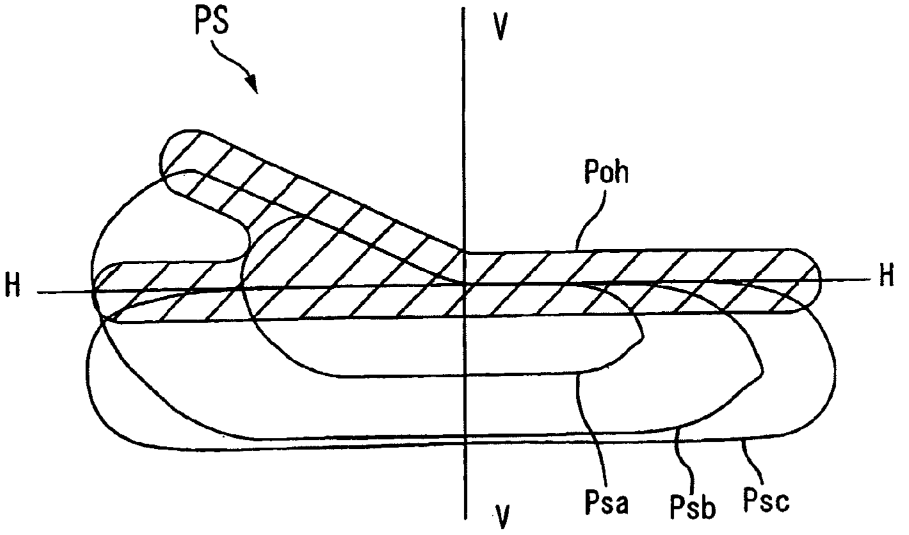
FIG. 6 is a front view of a light distribution pattern of the vehicle headlamp according to the first exemplary embodiment of the present invention.

Further, the light distribution pattern PS for low beam, which is shown in FIG. 6 and obtained by combining the small, intermediate, and wide diffusion light distribution patterns shown in FIGS. 5A to 5C, is formed by the light source unit assembly 10 in which the first, second, and third projector-type light source units 10A, 10B, and 10C are integrated. The visibility of the light distribution pattern PS for low beam is improved as much as an overhead light distribution pattern Poh is added, and the overhead light distribution pattern Poh is formed of diffused light having low luminous flux density. Accordingly, light that becomes glare light against the oncoming vehicle is greatly reduced.

Figure 7:
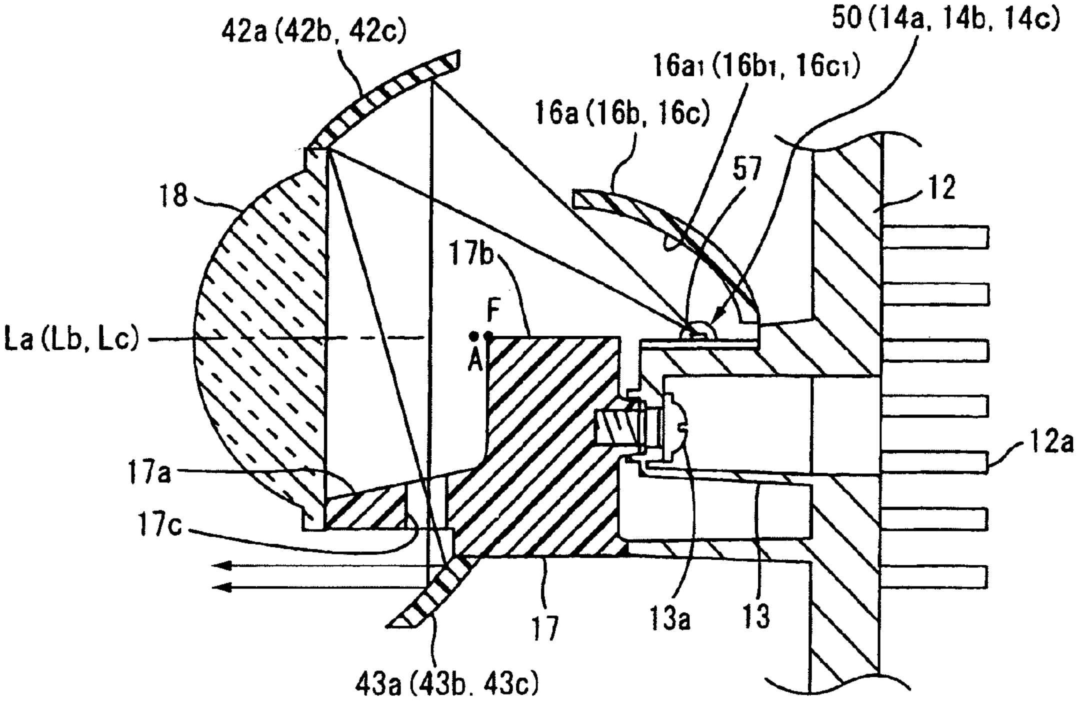
FIG. 7 is a longitudinal sectional view of a projection-type light source unit according to a second exemplary embodiment of the present invention, showing a light path for an overhead light distribution.

FIG. 7 is a longitudinal sectional view of a projection-type light source unit according to a second exemplary embodiment of the present invention.

In the above-mentioned first exemplary embodiment, the diffused light is radiated from the surface of the cover member 56 of the LED module 50 on which the fine concave and convex portions 57 are formed. Then, the radiated light is reflected by the subreflector 40*a* (40*b*, 40*c*) and then is distributed from the slit 19 of the convex projection lens 18 toward the front side of the vehicle headlamp. However, in the second exemplary embodiment, the diffused light is radiated from the surface of the cover member 56 of the LED module 50 on which the fine concave and convex portions 57 are formed. Then, the radiated light is reflected downward by a subreflector 42*a* (42*b*, 42*c*) and through an opening 17*c* formed in the extending portion 17*a* of the shade 17. Once the light is guided through the opening 17*c* to a lower side of the shade 17, the light is reflected by a second subreflector 43*a* (43*b*, 43*c*) so as to be distributed toward the front side of the vehicle headlamp.

Other structures of the second exemplary embodiment are the same as those of the first exemplary embodiment, and thus the repeated description will be omitted here.

Figure 8:
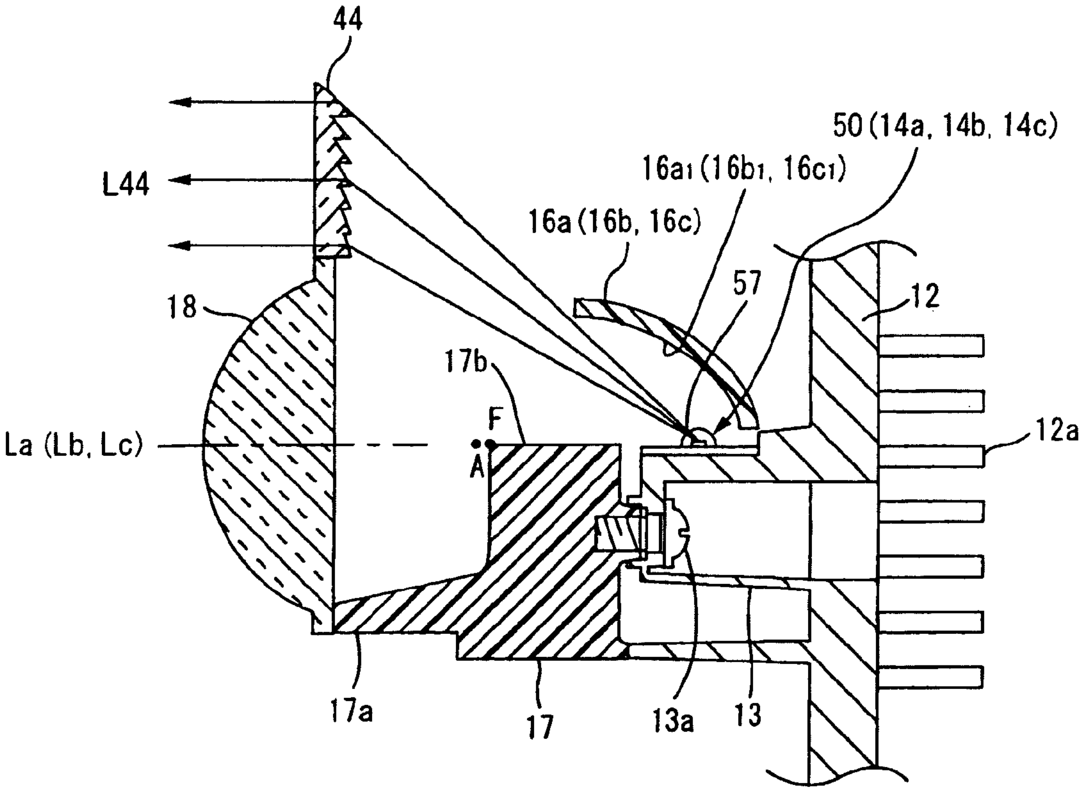
FIG. 8 is a longitudinal sectional view of a projection-type light source unit according to a third exemplary embodiment of the present invention, and showing a light path for an overhead light distribution.

FIG. 8 is a longitudinal sectional view of a projection-type light source unit constituting a main part of a vehicle headlamp according to a third exemplary embodiment of the present invention.

In the above-described first and second exemplary embodiments, the diffused light is radiated from the surface of the cover member 56 of the LED module 50 on which the fine concave and convex portions 57 are formed, and is then reflected by the either a subreflector 40*a* (40*b*, 40*c*) in the case of the first exemplary embodiment, or the first subreflector 42*a* (42*b*, 42*c*) and the second subreflector 43*a* (43*b*, 43*c*) in the case of the second exemplary embodiment, and then is distributed toward the front side of the vehicle headlamp. However, in the third exemplary embodiment, the diffused light is radiated from the surface of the cover member 56 of the LED module 50 on which the fine concave and convex portions 57 are formed, then is directly distributed toward the front side of the vehicle headlamp by a Fresnel lens 44. The Fresnel lens 44 is disposed on the periphery of the convex projection lens 18 and extends in a circular arc shape.

Other structures of the third exemplary embodiment are the same as those of the first exemplary embodiment, and thus the repeated description will be omitted here.

Meanwhile, in the above-mentioned exemplary embodiments, the fine concave and convex portions 57 are formed on the outer surface of the spherical cover member 56. However, the position where the fine concave and convex portions are formed is not limited to the outer surface of the cover member, and the fine concave and convex portions 57 may alternatively be formed on the inner surface of the spherical cover member 56 or on both inner and outer surfaces.

Further, in the above-mentioned first exemplary embodiment, the fine concave and convex portions 57 on the outer surface of the cover member 56 are formed only on a region of the outer surface of the cover member 56, which corresponds to a region between an outer edge 40*a*1 (40*b*1, 40*c*1) corresponding to a front edge portion of the reflector 16*a* (16*b*, 16*c*) and an outer edge 40*a*2 (40*b*2, 40*c*2) corresponding to a front edge portion of the convex projection lens 18 (i.e., a region corresponding to the subreflector 40*a* (40*b*, 40*c*)). However, the fine concave and convex portions may be formed a region 58 (shown in FIG. 4) other than the region of the outer surface of the cover member 56 that corresponds to the reflector 16*a* (16*b*, 16*c*).

Furthermore, as described above, the fine concave and convex portions 57 are formed, for example, by an etching process. If the area to be etched is small, it is easier to form the fine concave and convex portions. However, if the fine concave and convex portions 57 are formed on the region 58 that does not correspond to the reflector, the light, which travels from the cover member 56 toward the region 58 not corresponding to the reflector, becomes diffused light. In other words, if a larger portion of the cover member 56 is provided with the fine concave and convex portions 57, more light becomes diffused light. Therefore, it is possible to more reliably avoid generating unexpected glare light.

In addition, the cover member 56 is made of glass in the above-mentioned exemplary embodiments. However, alternatively, the cover member 56 may be made of a synthetic resin.

Further, in the above-described exemplary embodiments, the cover member 56 is formed of a hollow body. However, alternatively, the cover member 56 may be formed of a resin molded solid body integrally formed with an LED chip. Furthermore, if the cover member is formed of the resin molded solid body integrally formed with an LED chip 54, it is possible to form the fine concave and convex portions only on the outer surface of the cover member 57.

In cases in which the cover member is formed of a resin molded solid body, the light emitted from the LED chip is refracted by the cover member when the light is transmitted through the cover member. Thus, it is difficult to arrange the reflecting surface of the reflector to control the light distribution using the reflector. However, the light emitted from the LED chip is not affected by refraction when the cover member is formed of a hollow glass spherical body (e.g., a thin glass sphere). Thus, when the cover member is formed of a hollow glass spherical bodym, it is easier to control the light distribution using the reflector, and further it is easier to arrange the reflecting surface of the reflector.

As discussed above, according to exemplary embodiments of the present invention, there is provided a vehicle headlamp. The vehicle headlamp includes at least one projection-type light source unit housed in a lamp chamber. The projection-type light source includes a projection lens; a shade forming a cut-off line; an LED light source for emitting light, wherein the LED light source includes a substrate; an LED chip disposed on the substrate; and a translucent spherical cover member covering the LED chip, and is disposed such that an irradiation center axis of the LED chip is oriented in a direction substantially perpendicular to an optical axis of the projection-type light source unit, and wherein fine concave and convex portions are formed on a region of the cover member except a region corresponding to the reflector so as to diffuse light transmitted through the cover member, a reflector configured to reflect and guide the light emitted from the LED light source such that the light is concentrated near a rear focus of the projection lens; and an optical element configured to guide the diffused light toward a front side of the vehicle headlamp so as to form an overhead light distribution.

Moreover, the cover member may be formed of a resin molded solid body or a hollow glass spherical body. The fine concave and convex portions may be formed on an outer surface of the cover member when the cover member is formed of the resin molded solid body. The fine concave and convex portions may be formed on at least one of an inner surface and an outer surface when the cover member is formed of the hollow glass spherical body.

According to the exemplary embodiments of the present invention, a broad overhead light distribution pattern formed by diffused light having a very low luminous flux density is added to a light distribution pattern for a low beam that has a cut-off line. Accordingly, the visibility to the front of the vehicle is improved, and light does not produce glare light against an oncoming vehicle. That is, it is possible to suppress glare light seen by oncoming vehicles without reducing the visibility of the driver of the vehicle using a structure in which fine concave and convex portions are directly formed on the cover member.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. A vehicle headlamp comprising:

at least one projection-type light source unit housed in a lamp chamber, the projection-type light source comprising:

a projection lens;

a shade which forms a cut-off line;

a light emitting diode (LED) light source comprising:

a substrate;

an LED chip disposed on the substrate such that an irradiation center axis of the LED chip is oriented in a direction substantially perpendicular to an optical axis of the projection-type light source unit; and a cover member which covers the LED chip, a region of the cover member comprising a plurality of concave and convex portions so as to diffuse light transmitted through the cover member;

a reflector which is configured to reflect and guide the light emitted from the LED light source such that the light is concentrated near a rear focus of the projection lens; and an optical element which is configured to guide the diffused light toward a front side of the vehicle headlamp so as to form an overhead light distribution, wherein the optical element comprises a first subreflector and a second subreflector, a portion of the shade comprises an opening which is substantially perpendicular to the optical axis of the projection-type light source unit, and the first subreflector guides the light, which is transmitted through the cover member, through the opening and off of the second subreflector toward the front side of the vehicle headlamp so as to form the overhead light distribution.

2. The vehicle headlamp according to claim 1, wherein the plurality of concave and convex portions are formed over the entire cover member except a region corresponding to the reflector.

3. The vehicle headlamp according to claim 1, wherein the cover member is a translucent spherical cover member.

4. The vehicle headlamp according to claim 3, wherein the translucent spherical cover member is formed of a resin molded solid body, and wherein the plurality of concave and convex portions are formed on an outer surface of the translucent spherical cover member.

5. The vehicle headlamp according to claim 3, wherein the translucent spherical cover member is formed of a hollow glass spherical body, and wherein the plurality of concave and convex portions are formed on at least one of an inner surface and an outer surface of the hollow glass spherical body.

6. A vehicle headlamp comprising:

at least one projection-type light source unit housed in a lamp chamber, the projection-type light source comprising:

a projection lens;

a shade which forms a cut-off line;

a light emitting diode (LED) light source comprising:

a substrate;

an LED chip disposed on the substrate such that an irradiation center axis of the LED chip is oriented in a direction substantially perpendicular to an optical axis of the projection-type light source unit; and a cover member which covers the LED chip, a region of the cover member comprising a plurality of concave and convex portions so as to diffuse light transmitted through the cover member;

a reflector which is configured to reflect and guide the light emitted from the LED light source such that the light is concentrated near a rear focus of the projection lens; and an optical element which is configured to guide the diffused light toward a front side of the vehicle headlamp so as to form an overhead light distribution, wherein the optical element is a fresnel lens disposed on a periphery of the projection lens.

7. The vehicle headlamp according to claim 6, wherein the plurality of concave and convex portions are formed over the entire cover member except a region corresponding to the reflector.

8. The vehicle headlamp according to claim 6, wherein the cover member is a translucent spherical cover member.

9. The vehicle headlamp according to claim 8, wherein the translucent spherical cover member is formed of a resin molded solid body, and wherein the plurality of concave and convex portions are formed on an outer surface of the translucent spherical cover member.

10. The vehicle headlamp according to claim 8, wherein the translucent spherical cover member is formed of a hollow glass spherical body, and wherein the plurality of concave and convex portions are formed on at least one of an inner surface and an outer surface of the hollow glass spherical body.

11. A vehicle headlamp comprising:

a lamp chamber;

at least one projection-type light source unit housed in the lamp chamber, the projection-type light source comprising:

a projection lens comprising a slit at an edge portion thereof a shade which forms a cut-off line;

a light emitting diode (LED) light source comprising:

a substrate;

an LED chip disposed on the substrate such that an irradiation center axis of the LED chip is oriented in a direction substantially perpendicular to an optical axis of the projection-type light source unit; and a translucent spherical cover member which covers the LED chip, a region of the translucent spherical cover member comprising a plurality of concave and convex portions so as to diffuse light transmitted through the translucent spherical cover member;

a reflector which is configured to reflect and guide the light emitted from the LED light source such that the light is concentrated near a rear focus of the projection lens; and a subreflector which is disposed between the projection lens and the reflector and which guides the light which is transmitted through the translucent spherical cover member through the slit in the projection lens so as to form an overhead light distribution.

* * * * *